(12) United States Patent
Vander Lind et al.

(10) Patent No.: US 11,066,175 B2
(45) Date of Patent: Jul. 20, 2021

(54) CINCHED PARACHUTE

(71) Applicant: Kitty Hawk Corporation, Palo Alto, CA (US)

(72) Inventors: Damon Vander Lind, Alameda, CA (US); Cameron Robertson, San Mateo, CA (US)

(73) Assignee: Kitty Hawk Corporation, Palo Alto, CA (US)

( * ) Notice: Subject to any disclaimer, the term of this patent is extended or adjusted under 35 U.S.C. 154(b) by 95 days.

(21) Appl. No.: 16/666,236

(22) Filed: Oct. 28, 2019

(65) Prior Publication Data

US 2020/0062410 A1     Feb. 27, 2020

Related U.S. Application Data

(63) Continuation of application No. 15/357,904, filed on Nov. 21, 2016, now Pat. No. 10,518,888.

(51) Int. Cl.
*B64D 17/20* (2006.01)
*B64D 17/02* (2006.01)
*B64D 17/80* (2006.01)

(52) U.S. Cl.
CPC ............ *B64D 17/02* (2013.01); *B64D 17/20* (2013.01); *B64D 17/80* (2013.01)

(58) Field of Classification Search
CPC ........ B64D 17/02; B64D 17/20; B64D 17/80; B64D 17/343
See application file for complete search history.

(56) References Cited

U.S. PATENT DOCUMENTS

| | | | |
|---|---|---|---|
| 2,472,601 A | 6/1949 | Mallory | |
| 2,577,047 A | 12/1951 | Taylor | |
| 2,577,048 A | 12/1951 | Taylor | |
| 2,626,117 A * | 1/1953 | Heinrich | B64D 17/343 244/152 |
| 2,764,375 A | 9/1956 | Lemoigne | |
| 2,922,605 A | 1/1960 | Turati | |
| 3,726,500 A | 4/1973 | Bockelmann | |
| 5,205,517 A * | 4/1993 | Reuter | B64D 17/343 244/145 |
| 7,416,158 B2 | 8/2008 | Sadeck | |
| 7,419,122 B2 * | 9/2008 | Lee | B64D 17/343 244/147 |
| 8,096,509 B2 * | 1/2012 | Fox, Jr. | B64D 17/64 244/152 |
| 8,118,262 B2 * | 2/2012 | Jameson | B64D 17/18 244/152 |
| 10,689,123 B2 * | 6/2020 | Fox, Jr. | B64D 17/02 |
| 2003/0197095 A1 | 10/2003 | Preston | |
| 2010/0032527 A1 | 2/2010 | Fox, Jr. | |

* cited by examiner

*Primary Examiner* — Brian M O'Hara
(74) *Attorney, Agent, or Firm* — Van Pelt, Yi & James LLP

(57) ABSTRACT

A cinched parachute is disclosed. In various embodiments, a cinched parachute as disclosed herein includes a canopy comprising one or more sections of canopy material, and a device integrated with the canopy that controls dimensions of the canopy material. For example, in some embodiments the device may be used to control the size of an opening atop the parachute.

19 Claims, 14 Drawing Sheets

CINCHED PARACHUTE

CROSS REFERENCE TO OTHER APPLICATIONS

This application is a continuation of co-pending U.S. patent application Ser. No. 15/357,904 entitled CINCHED PARACHUTE filed Nov. 21, 2016 which is incorporated herein by reference for all purposes.

BACKGROUND OF THE INVENTION

Parachutes are used to recover aircrafts in times of emergency. Conditions during the time of emergency can vary drastically. Different types of parachutes may be suited for different conditions. Weight limitations may prevent an aircraft from being outfitted with multiple varying parachutes.

BRIEF DESCRIPTION OF THE DRAWINGS

Various embodiments of the invention are disclosed in the following detailed description and the accompanying drawings.

DETAILED DESCRIPTION

Figure 1A:
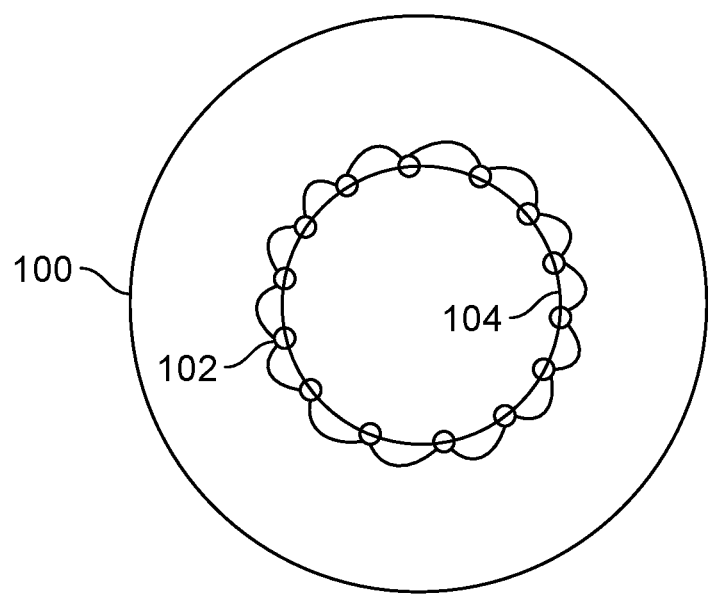
FIG. 1A is a diagram illustrating an embodiment of a cinched parachute.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A cinched parachute is disclosed. The parachute comprises a canopy comprising one or more sections of canopy material. The parachute comprises a device integrated with the canopy that controls dimensions of the canopy material. The device may control a size of an inner radius of the parachute. The cinched parachute is attached to an aircraft. The device may be positioned on the canopy, threaded through the canopy, or attached to the canopy. In some embodiments, the device comprises a control tether, holding device, and severing device. The control tether may act as a drawstring, controlling the amount of air that can enter the parachute.

The device may reef the parachute from points above the tethers of the parachute. The device may control a size of an opening atop the parachute. The control tether may be threaded through the parachute around the opening. The control tether may be positioned between tethers of the parachute and an opening atop the parachute. The control tether may cinch the parachute around its middle. The control tether may cinch a section of the canopy material of the parachute into a packed configuration. The holding device or severing device may be used to constrain or release the control tether. The device may modify the parachute based on the environment or conditions. For example, the parachute may be contracted during high speed conditions. The control tether may be loosened when the parachute is close to the ground in order to allow the parachute to fall more slowly.

FIG. 1A is a diagram illustrating an embodiment of a cinched parachute. In the example shown, parachute 100 is shown from a top view. Parachute 100 comprises an opening. The opening may occur at the top of parachute 100 when parachute 100 is deployed. The opening may be large in proportion to the parachute when a control tether is loosened. In some embodiments, a large opening in relation to a diameter of the parachute allows the parachute to be deployed quickly in a vertical direction.

In the example shown, the parachute has multiple rivets such as rivet 102 that border the opening. The rivets may be reinforced. The rivets may be made of various materials, including metals or composites. As shown, the parachute has some slack between each rivet. In some embodiments, when the opening is at its largest, no slack is present in the parachute between each rivet. Control tether 104 is threaded through the rivets surrounding the opening. Both ends of control tether 104 may be threaded through a same rivet. The ends may hang down through the rivet. The parachute may be used to recover a vehicle, an aircraft, a person, or any appropriate object. The ends of control tether 104 may be held by a component present on an aircraft or object that the parachute is attached to. In some embodiments, one end of control tether 104 is secured in the parachute opening, whereas the other end is held by the component. For example, one end may be knotted, wherein the knot prevent the end from slipping through a rivet.

In some embodiments, the parachute does not have rivets. The parachute may have holes through which the control tether is threaded. The opening may be surrounded by a casing or loops that the control tether is threaded through. The control tether may act as a drawstring that cinches the parachute opening together. In various embodiments, the control tether is threaded through the parachute using various appropriate method.

Figure 1B:
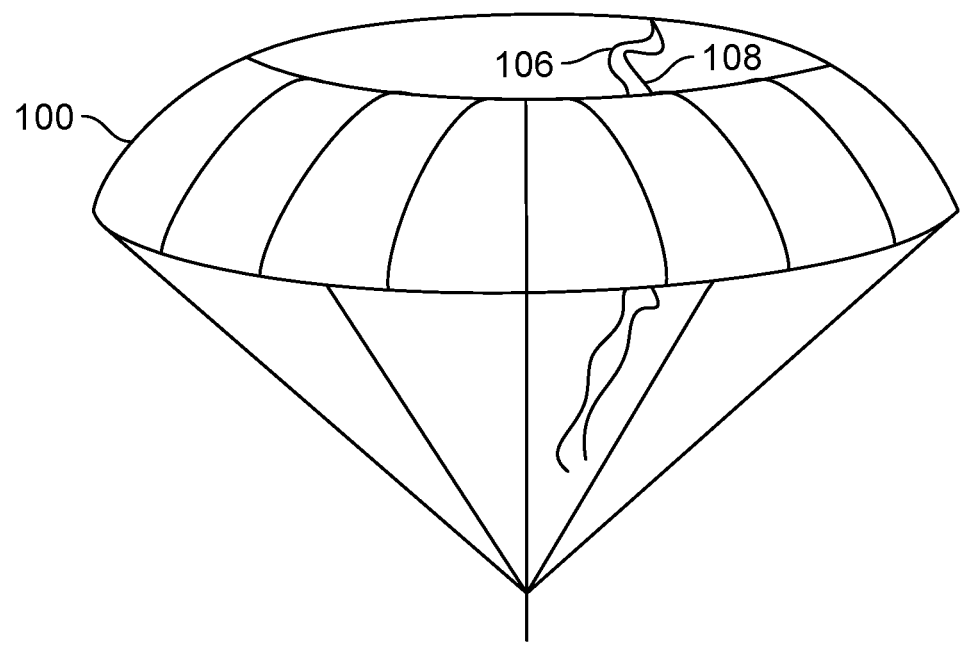
FIG. 1B is a diagram illustrating an embodiment of a cinched parachute.

FIG. 1B is a diagram illustrating an embodiment of a cinched parachute. The parachute is shown from a side view. The control tether is loosened, allowing the opening at the top of parachute 100 to be at its maximum diameter. Parachute 100 is fully filled with air. Control tether ends 106 and 108 hang through the parachute's top opening.

Figure 1C:
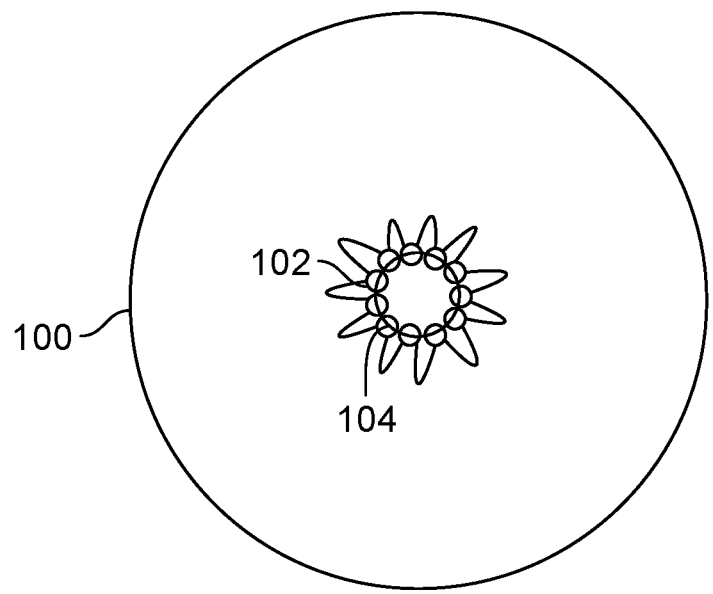
FIG. 1C is a diagram illustrating an embodiment of a cinched parachute.

FIG. 1C is a diagram illustrating an embodiment of a cinched parachute. In some embodiments, FIG. 1C shows parachute 100 of FIG. 1A after the control tether is tightened. In the example shown, the diameter of the opening is smaller than in FIG. 1A. In some embodiments, one or both ends of control tether 104 have been pulled downwards, causing the control tether to draw the opening smaller. One or both ends of the control tether may be pulled via a component present on an object attached to the parachute or attached only to the control tether. Rivet 102 as shown has been pulled flush against adjacent rivets. In some embodiments, the opening's minimum size is determined by the size of rivets or holes surrounding the opening. The opening's minimum size may be affected by the parachute's material or control tether's material. For example, a thin, flexible control tether material may allow the control tether to pull the opening smaller than a stiff, thick material.

In some embodiments, changing the size of the opening of the parachute affects the parachute's aerodynamics. The parachute of FIG. 1C may be ideal for high speed conditions. High speed conditions may cause a large parachute to rip. Reefing the parachute using the control tether may decrease the amount of air the parachute can fill with, limiting a load the parachute experiences upon deployment. Cinching the parachute in may optimize the parachute for high speed conditions.

Loosening the control tether and allowing the opening to widen may allow the parachute to catch a greater amount of air. The parachute of FIG. 1A may be ideal for low altitude conditions, wherein an aircraft or target object must be slowed as much as possible. The target may impact ground at too high a speed in the event that the parachute remains cinched. In some embodiments, the cinched parachute's ability to be adapted for various conditions quickly and reversibly allows a target to be safely recovered in changing conditions. The cinched parachute may also be more lightweight to store on an aircraft than storing multiple parachute optimized for different conditions.

Figure 1D:
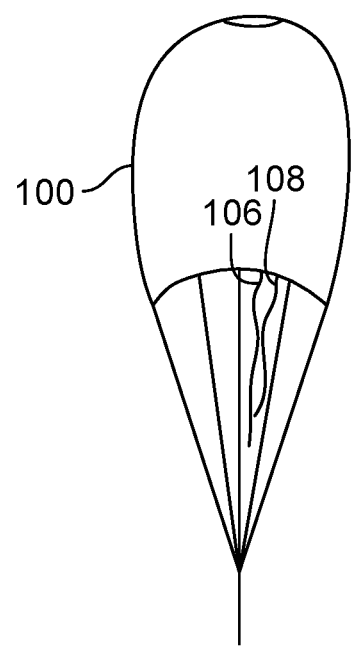
FIG. 1D is a diagram illustrating an embodiment of a cinched parachute.

FIG. 1D is a diagram illustrating an embodiment of a cinched parachute. Parachute 100 is shown from a side view. The parachute's opening has a small diameter. Control tether ends 106 and 108 hang through the parachute. The parachute's canopy is held close, limiting an amount of air allowed into the parachute.

Figure 1E:
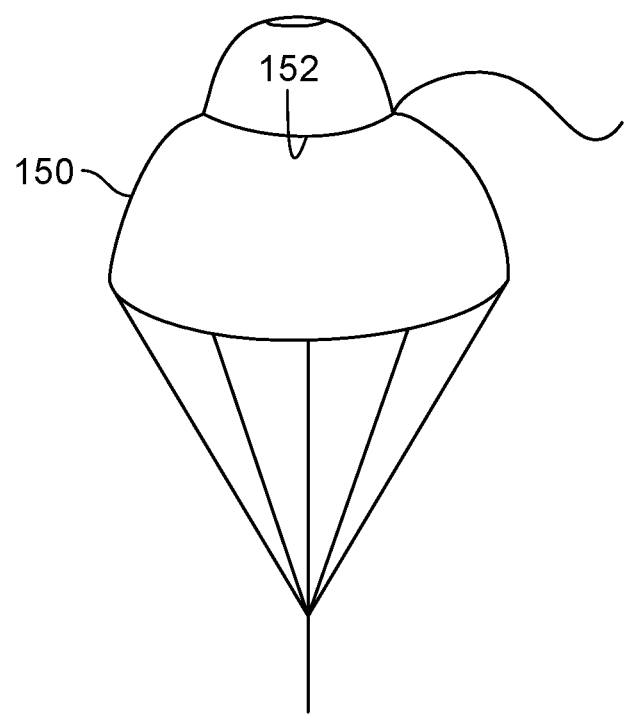
FIG. 1E is a diagram illustrating an embodiment of a cinched parachute.

FIG. 1E is a diagram illustrating an embodiment of a cinched parachute. In the example shown, parachute 150 comprises control tether 152. Control tether 152 restrains an inner radius of parachute 150 in between an opening atop the parachute and the parachute's tethers. An inner radius of the parachute may be defined at a point equidistant from an opening atop the parachute and a lower opening of the parachute. The inner radius may be defined to be measured from a point that is a predetermined distance from an opening atop the parachute. The inner radius may be defined as a radius of an opening atop the parachute.

One end of control tether 152 is held or attached securely to the parachute. Another end trails from the parachute. In some embodiments, neither end of the control tether is held on an aircraft or other target object attached to the parachute. Traditional reefing systems may reef the parachute by restraining tethers of the parachute.

Figure 1F:
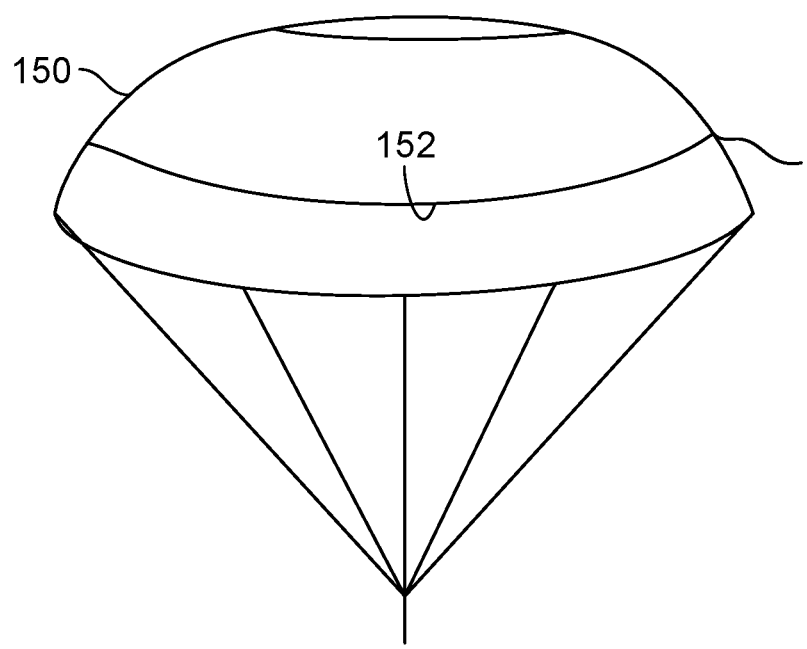
FIG. 1F is a diagram illustrating an embodiment of a cinched parachute.

FIG. 1F is a diagram illustrating an embodiment of a cinched parachute. In the example shown, parachute 150 is expanded and fully filled with air. Control tether 152 has been loosened.

Figure 1G:
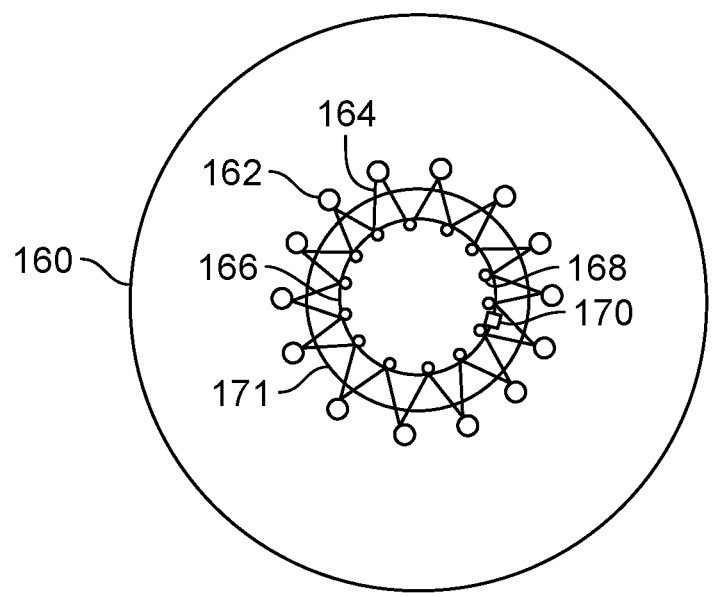
FIG. 1G is a diagram illustrating an embodiment of a cinched parachute.

FIG. 1G is a diagram illustrating an embodiment of a cinched parachute. In some embodiments, a control tether may be controlled by its length rather than its ends. In the example shown, parachute 160 comprises control tether 164. As shown, control tether 164 is used to control a diameter of opening 171. Opening 171 is positioned at the top and center of the parachute. Holes such as hole 162 are punched through the parachute surrounding opening 171. Control tether 164 is threaded through the holes. Between holes, lengths of the control tether are pulled downward through opening 171. Each length may be knotted, as shown by knot 168. The lengths of control tether may be held together by band 166. Explosive 170 may be used to sever band 166, causing opening 171 to be released.

In some embodiments, rather than using a continuous tether, multiple separate tethers are used. Tethers may be directly attached to the parachute. For example, multiple small strands may be attached to the parachute surrounding an opening of the parachute. The strands may be gathered inside of the parachute, pulling the parachute into itself. The strands may have beads, knots, or an appropriate element at their ends in order to be held together. The strands may be held in an explosive bolt or other severing device.

Figure 1H:
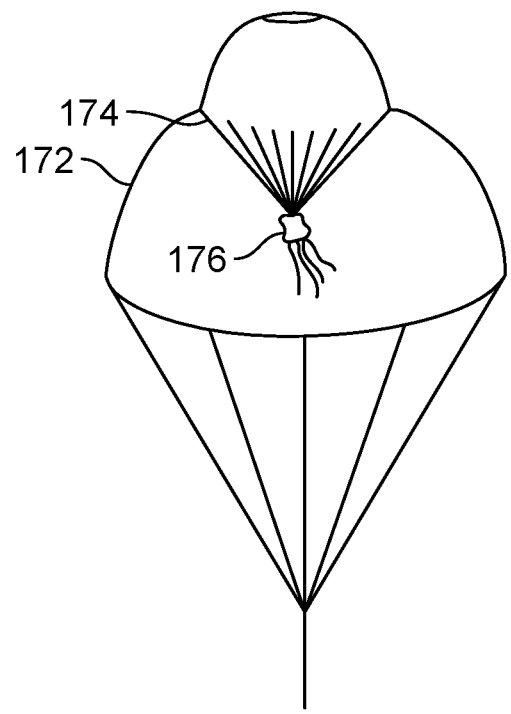
FIG. 1H is a diagram illustrating an embodiment of a cinched parachute.

FIG. 1H is a diagram illustrating an embodiment of a cinched parachute. In the example shown, parachute 172 comprises multiple strands of tether that are used to cinch the parachute, such as strand 174. The strands are attached roughly halfway in the middle of the parachute, away from the top opening and bottom opening of the parachute. The strands are gathered in component 179. Component 179 may comprise an explosive, line cutter, or any other appropriate release mechanism.

Figure 2A:
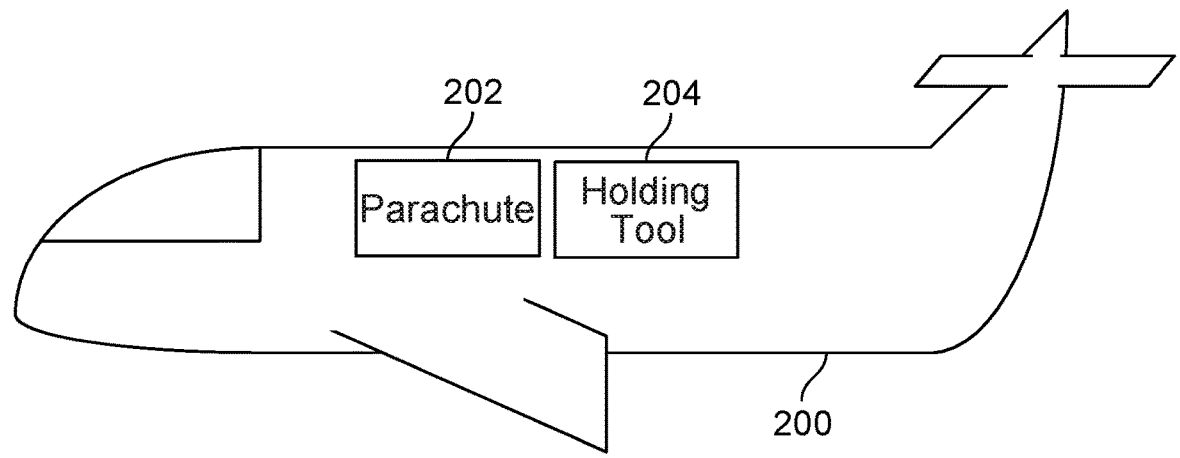
FIG. 2A is a diagram illustrating an embodiment of an aircraft comprising a cinched parachute.

FIG. 2A is a diagram illustrating an embodiment of an aircraft comprising a cinched parachute. In the example shown, aircraft 200 comprises parachute 202. Parachute 202 may be a cinched parachute. The cinched parachute may be deployed from an aircraft in the event of an emergency. In the example shown, aircraft 200 comprises holding device 204. In some embodiments, one or both ends of the control tether are held in holding device 204. Holding device 204 may comprise a spool, wherein spinning the spool releases the control tether or draws in the control tether. Holding device 204 may be motorized.

In some embodiments, holding device 204 comprises a blade. Holding device 204 may sever one or both ends of the control tether. Severing the control tether may cause the parachute's opening to reach its largest diameter more quickly than releasing a length of the control tether. The tool may be triggered to sever the control tether in the event the target needs to rapidly slow down. The holding device may include a severing component or a severing device may separately exist.

In some embodiments, holding device 204 may be triggered to automatically perform an action based on information received via sensors on the aircraft. For example, information acquired via accelerometers, cameras, radar, or any other appropriate mechanism may cause holding device 204 to adjust the size of the opening of the parachute. Holding device 204 may be controlled via a timing device. For example, the holding device may sever the control tether after a predetermined amount of time has elapsed since deployment.

Holding device 204 may be secured to aircraft 200. Holding device 204 may not be attached to anything and may be carried off with the control tether after the parachute is deployed.

Figure 2B:
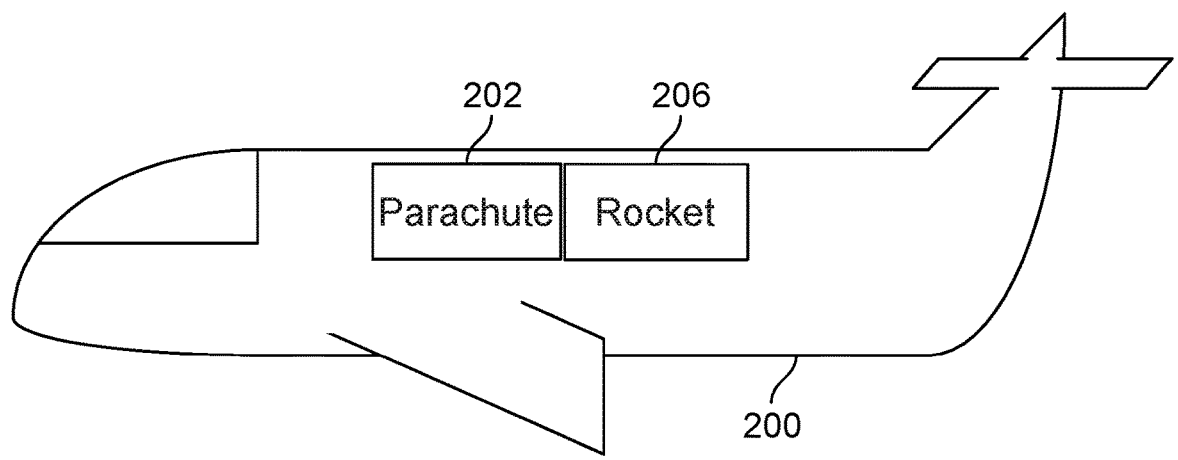
FIG. 2B is a diagram illustrating an embodiment of an aircraft comprising a cinched parachute.

FIG. 2B is a diagram illustrating an embodiment of an aircraft comprising a cinched parachute. In the example shown, aircraft 200 comprises parachute 202 and rocket 206. In some embodiments, one or more rockets are used to deploy the cinched parachute. The rockets may be used to tow the parachute upwards away from the aircraft.

Figure 3A:
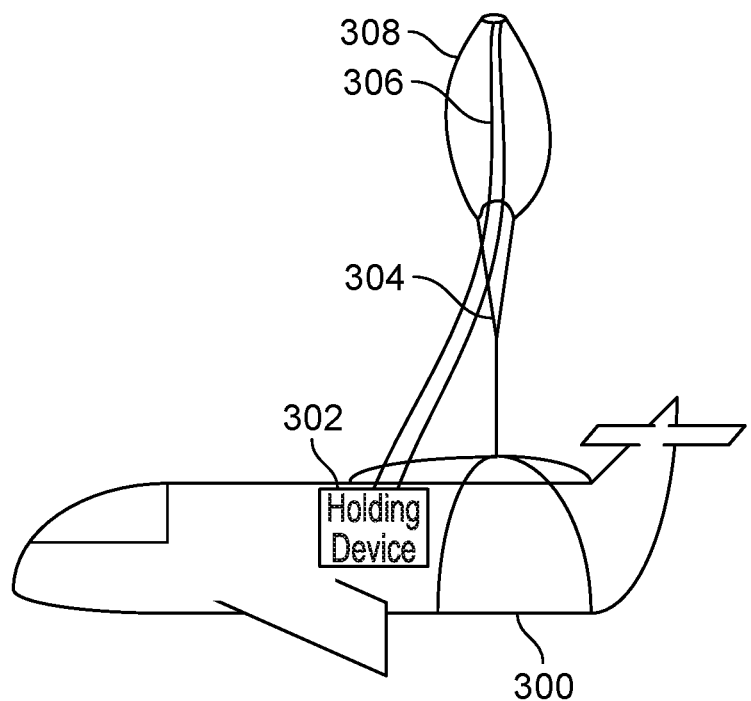
FIG. 3A is a diagram illustrating an embodiment of an aircraft comprising a cinched parachute in a tightened state.

FIG. 3A is a diagram illustrating an embodiment of an aircraft comprising a cinched parachute in a tightened state. In the example shown, parachute 308 has been deployed from aircraft 300. The parachute is tethered to the aircraft via tether 304. In the example shown, both ends of control tether 306 drop down from inside parachute 308 and are secured in holding device 302. Control tether 306 may be threaded around the opening at the top of parachute 308. The ends may be secured tightly so they are not able to slip within the holding device. Holding device 302 may comprise a brake pad or a clamp.

In the example shown, control tether 306 is used to cinch the opening. The opening of parachute 308 is small, causing the parachute to take on a narrow shape. The parachute may be able to resist high winds and high loads while its opening is pulled to its minimum size. In some embodiments, the cinched parachute is deployed with its opening pulled to its minimum size when the parachute is deployed above a predetermined altitude.

Figure 3B:
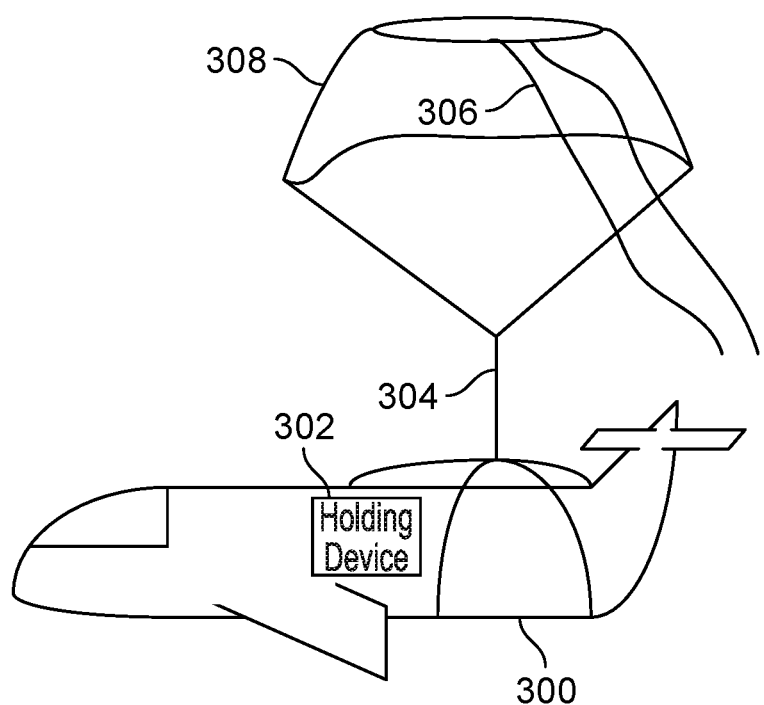
FIG. 3B is a diagram illustrating an embodiment of an aircraft comprising a cinched parachute in a released state.

FIG. 3B is a diagram illustrating an embodiment of an aircraft comprising a cinched parachute in a released state. In the example shown, control tether 306 is severed. Holding device 302 may have been used to sever the tether. Both ends of the control tether are loose. In some embodiments, one end is securely fastened to the opening such that only one end is loose when the control tether is severed. Due to control tether 306 being tethered, parachute 308 is fully expanded. The opening at the top of parachute 308 has widened several times the size of the opening at the top of parachute 308 in FIG. 3A. Branches of tether 304 are splayed wider than in FIG. 3A. Aircraft 300 may be at a lower speed or lower altitude than an aircraft that has its opening cinched tightly.

In some embodiments, control tether 306 is severed prior to deployment of the parachute. For example, in the event that the aircraft is falling very low to the ground, it may be optimal for the parachute to catch as much air as possible. In the event that risk of the parachute being compromised due to wind or load is low, the parachute may be deployed to its fully open state as soon as possible.

In some embodiments, control tether 306 is severed after the parachute is deployed with the opening tightly cinched. In some embodiments, the tether is not severed but rather drawn in or out. The cinched parachute and control tether may provide a reversible means of converting the parachute for various conditions. The control tether may be manipulated automatically. A manual override option may exist.

Figure 3C:
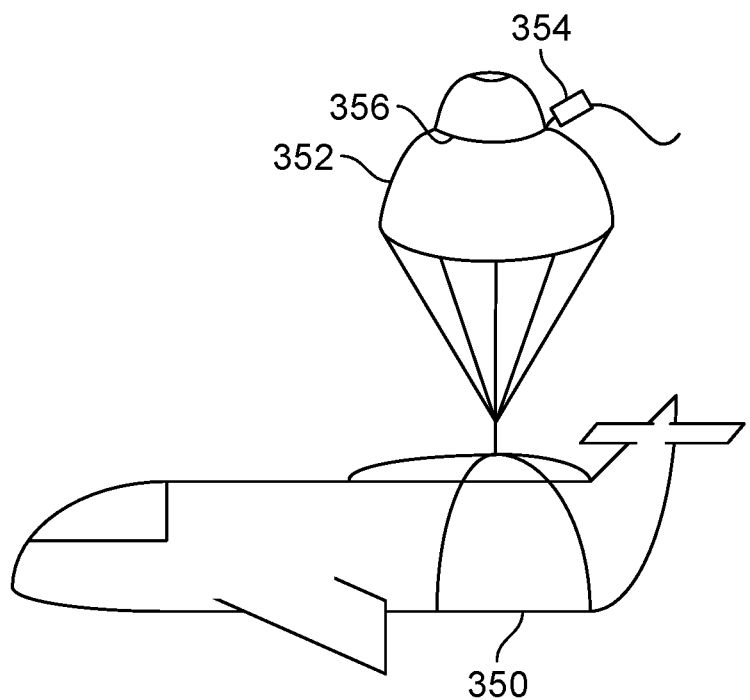
FIG. 3C is a diagram illustrating an embodiment of an aircraft comprising a cinched parachute in a tightened state.

FIG. 3C is a diagram illustrating an embodiment of an aircraft comprising a cinched parachute in a tightened state. In the example shown, aircraft 350 comprises parachute 352. Parachute 352 is cinched around a center of its canopy via control tether 356. Control tether 356 travels through holding device 354. Holding device 354 may be positioned atop the parachute's canopy. Holding device 354 may maintain a minimum width of an inner radius of the parachute. In some embodiments, control tether 356 will be tightened further than desired due to natural forces in the absence of holding device 354. Holding device 354 may allow the tether to travel towards the parachute, loosening the tether, but not allow the tether to travel away from the parachute, further cinching the parachute past a predetermined minimum radius. Holding device 354 may hold the control tether at a desired point.

Figure 3D:
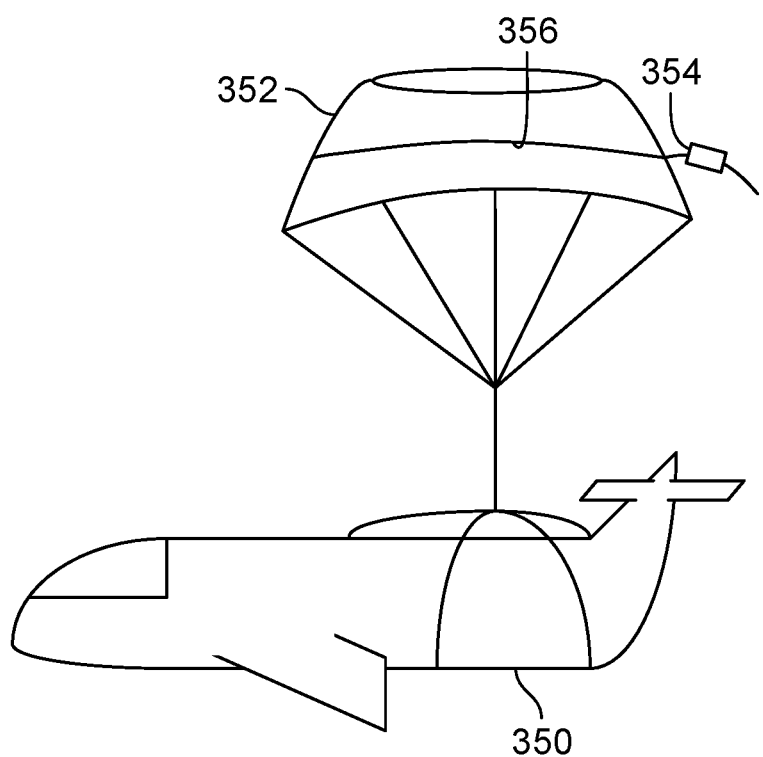
FIG. 3D is a diagram illustrating an embodiment of an aircraft comprising a cinched parachute in a released state.

FIG. 3D is a diagram illustrating an embodiment of an aircraft comprising a cinched parachute in a released state. In the example shown, control tether 356 has been loosened. Parachute 352 is fully filled. In some embodiments, control tether 356 may be severed via a severing device. Holding device 354 and control tether 356 may fall away from parachute 352 and aircraft 250.

Figure 4A:
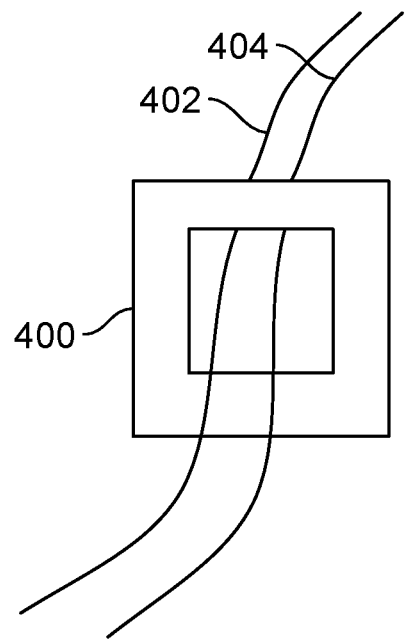
FIG. 4A is a diagram illustrating an embodiment of a severing device.

FIG. 4A is a diagram illustrating an embodiment of a severing device. In some embodiments, the cinched parachute includes a severing device that is present on desired target of recovery. The severing device may be a component of a holding device present on the target. In the example shown, severing device 400 has a hole wherein two ends of a control tether travel through. The severing device may allow the control tether ends to pass through freely. The bottoms of ends 402 and 404 as shown may be secured in a holding device.

Figure 4B:
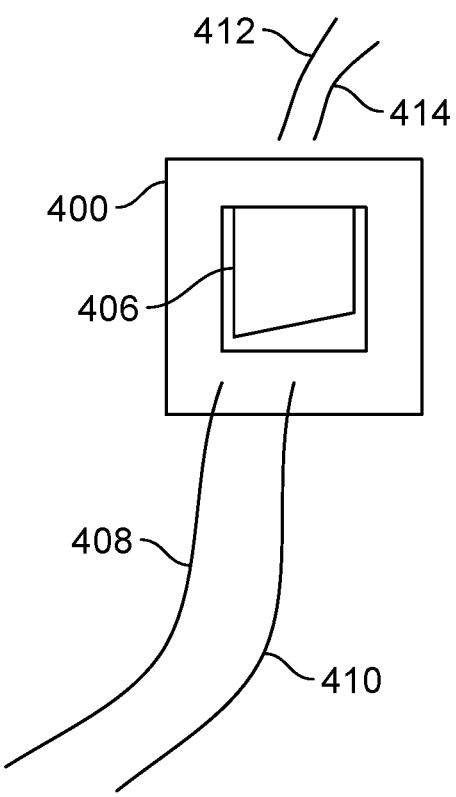
FIG. 4B is a diagram illustrating an embodiment of a severing device in use.

FIG. 4B is a diagram illustrating an embodiment of a severing device in use. In the example shown, severing device 400 includes blade 406. Blade 406 may be a retractable blade emerges from a surface of the tool. The severing device may have a cover on the blade wherein the cover is retracted or released when the tool is engaged. Blade 406 cuts the strands that were threaded through the hole of severing device 400. In some embodiments, tether pieces 412 and 408 are the result of tether end 402 of FIG. 4A being cut by the blade. Tether pieces 414 and 410 may result from tether end 404 of FIG. 4A.

In some embodiments, a severing device does not include a blade. The severing device may be an explosive line cutter. Multiple tethers may be gathered in an explosive bolted joint. A mechanical line release, bolt release, or solenoid actuated pin may be used. A line melting device may be used. For example, nichrome wire may be wrapped around ends of the control tether. Current may be applied to the wire, causing the wire to burn off the control tether.

Figure 5A:
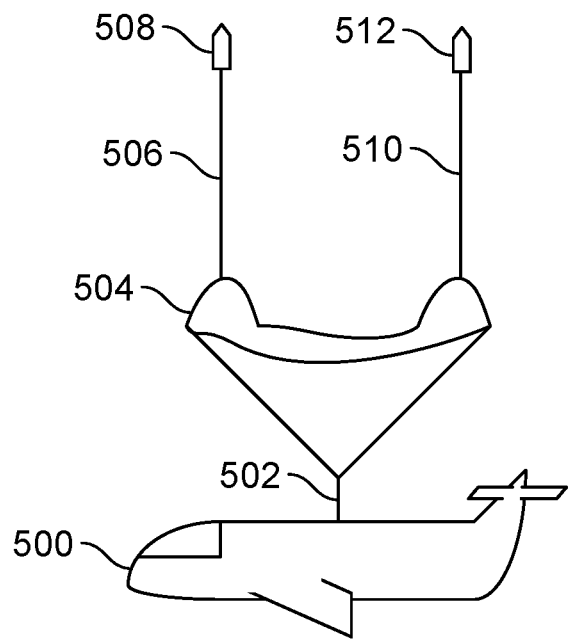
FIG. 5A is a diagram illustrating an embodiment of a cinched parachute in initial stages of deployment.

FIG. 5A is a diagram illustrating an embodiment of a cinched parachute in initial stages of deployment. In the example shown, rockets 508 and 512 are attached to cinched parachute 504 via tethers 506 and 510 respectively. Parachute 504 is attached to aircraft 500 via tether 502. Rockets 508 and 512 tow the parachute upwards, away from the aircraft. Parachute 504 may be initially deployed with its control tether loosened. Its opening may be at its maximum size. Parachute 504 may be initially deployed in a hollow cylindrical formation. Deploying the parachute with the control tether loosened may allow the parachute to be deployed in a ring shape rather than a disc shape. Having a large opening may allow the parachute to be deployed faster. The opening may decrease drag on the parachute.

In some embodiments, deploying the parachute with its control tether loosened enables smaller rockets to be used during deployment. The large opening in the parachute may decrease drag area, leading to quicker deployment speeds. Standard parachutes may initially become inverted upon deployment wherein towing the parachute up as a ring eliminates the inversion step and associated delay.

Figure 5B:
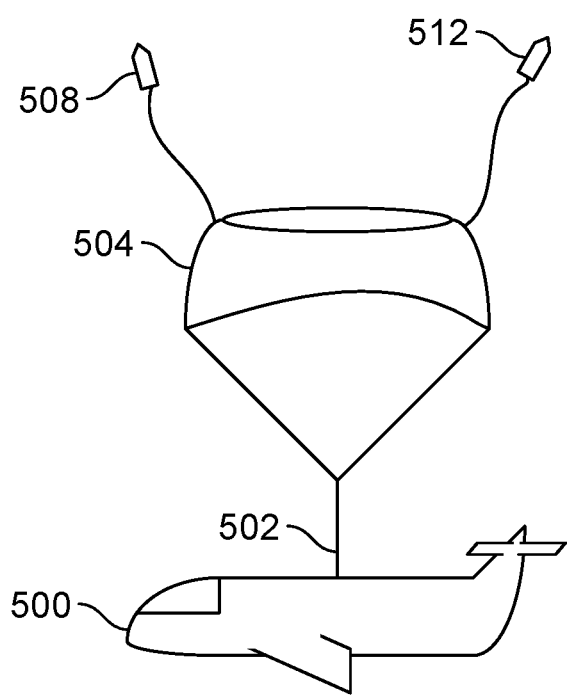
FIG. 5B is a diagram illustrating an embodiment of a cinched parachute in late stages of deployment.

FIG. 5B is a diagram illustrating an embodiment of a cinched parachute in late stages of deployment. In some embodiments, as the parachute is towed up in a ring shape, the parachute begins to inflate. As shown, parachute 504 has fully expanded. Tethers attaching rockets 508 and 512 to parachute 504 may be slack. The rockets may fall and hang off parachute 504. Tether 504 attaching parachute 504 to aircraft 500 is pulled taut.

In various embodiments, multiple rockets may be used. For example, rockets may be attached equidistant points surrounding the opening. The rockets may be configured to initially deploy upwards and then fly outwards, away from the opening. The rockets may be configured to detach after they burn out of fuel or after a predetermined amount of time.

Figure 6:
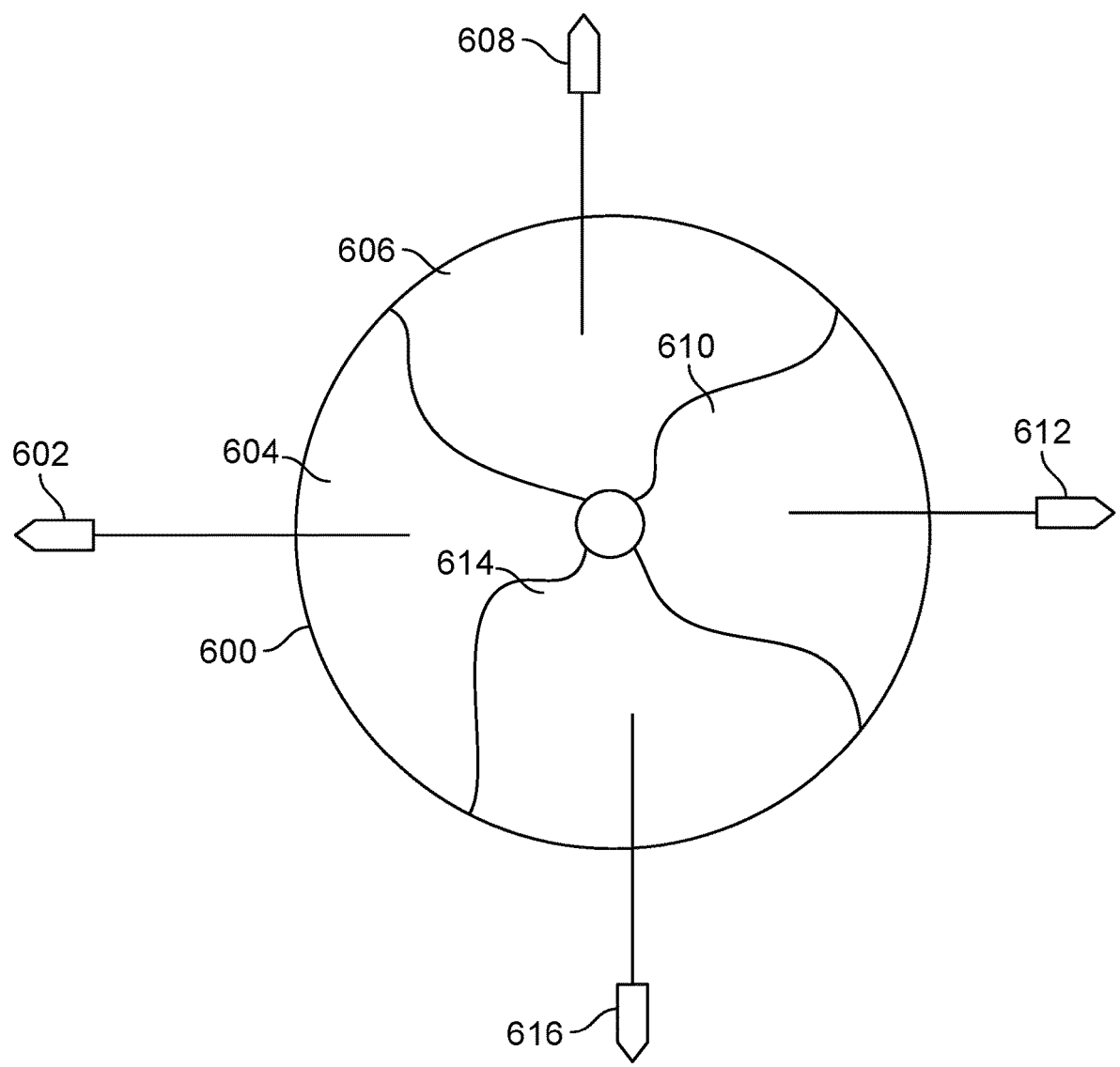
FIG. 6 is a diagram illustrating an embodiment of a cinched parachute deployed using rockets.

FIG. 6 is a diagram illustrating an embodiment of a cinched parachute deployed using rockets. In the example shown, multiple rockets are used to deploy the parachute. The opening may be circular in shape. The rockets may be attached circularly around the opening of the parachute. The rockets may be tethered to the parachute at a predetermined distance from the opening. In some embodiments, the cinched parachute may be stitched together form multiple panels of fabric. In the example shown, parachute 600 is made of panels 604, 606, 610, and 614. Rocket 602 is tethered to panel 604, rocket 608 is tethered to panel 606, rocket 612 is tethered to panel 610, and rocket 616 is tethered to panel 614.

In some embodiments, multiple rockets are attached near or around the control tether. The multiple rockets may initially pull the parachute taut in a vertical direction.

In various embodiments, varying methods of deployment are used to deploy the cinched parachute. The parachute may be deployed using projectiles that are not self-propelling. A chemical reaction may be harnessed to propel the parachute. A cinched parachute may be ideal for targets that have low weight requirements. The cinched parachute may be ideal for high speed aircraft. The cinched parachute may be sized based on an aircraft size or shape.

Figure 7:
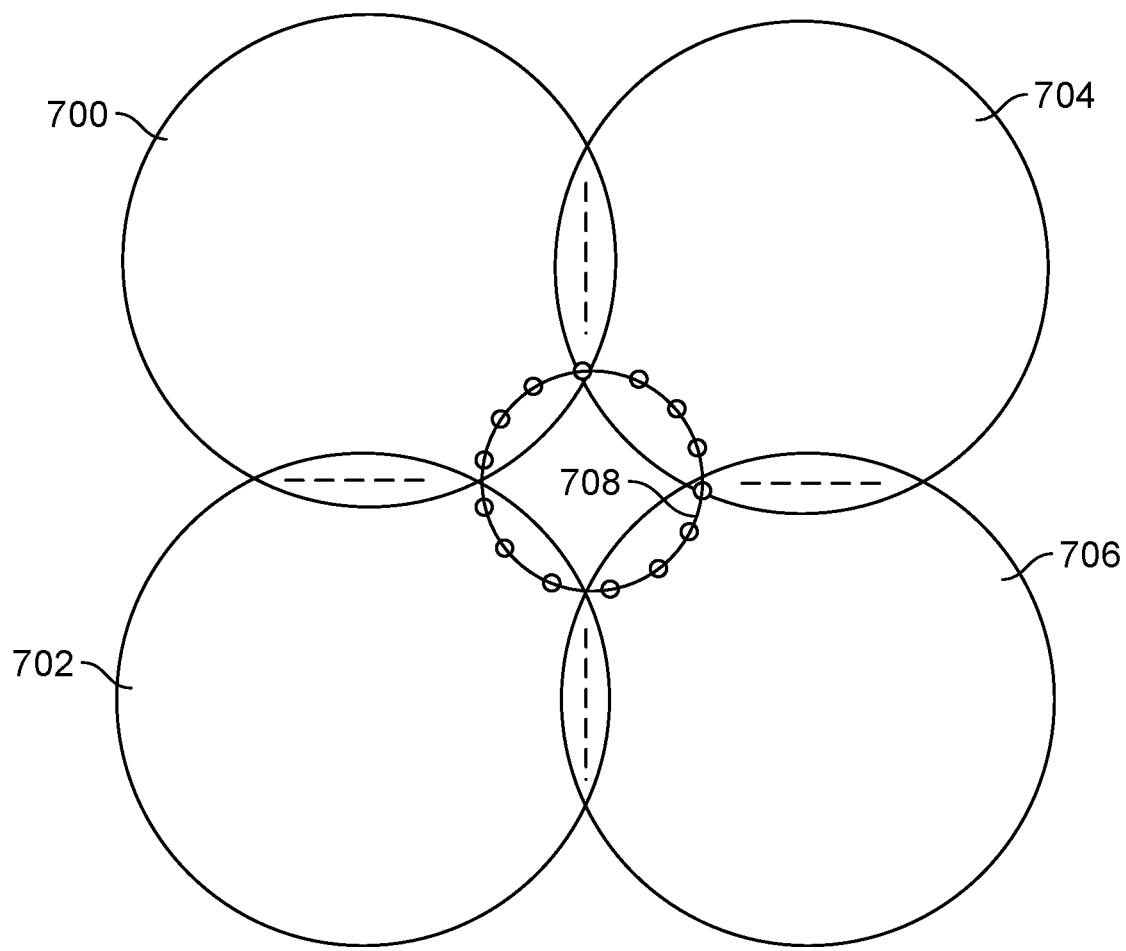
FIG. 7 is a diagram illustrating an embodiment of a cinched parachute composed of multiple joined parachutes.

FIG. 7 is a diagram illustrating an embodiment of a cinched parachute composed of multiple joined parachutes. In some embodiments, multiple small parachutes are used together as a cinched parachute. The small parachute may be stitched together, glued together, or otherwise attached. In the example shown, parachutes 700, 704, 706, and 702 are stitched together. Each of the four parachutes intersects with two other parachutes. An opening is present where all four parachutes meet. As shown, rivets surround the opening. Control tether 708 is threaded through the rivets.

In some embodiments, the size of the opening of the cinched parachute is controlled by an automated system. The automated system may manipulate the control tether to cinch or loosen the opening. The automated system may operate based on sensor information. Sensors may be present on the target. Sensor information may be communicated to the system via radio, telecommunications, or any appropriate method. The automated system may comprise a switching element or a microchip. The control tether may be controlled by a device that is connected to the control device via a wire. The wire may be wound around a riser of the parachute. The control device may be wireless. In some embodiments, an automated system reacts more quickly and accurately than a human in controlling the cinched parachute.

Figure 8A:
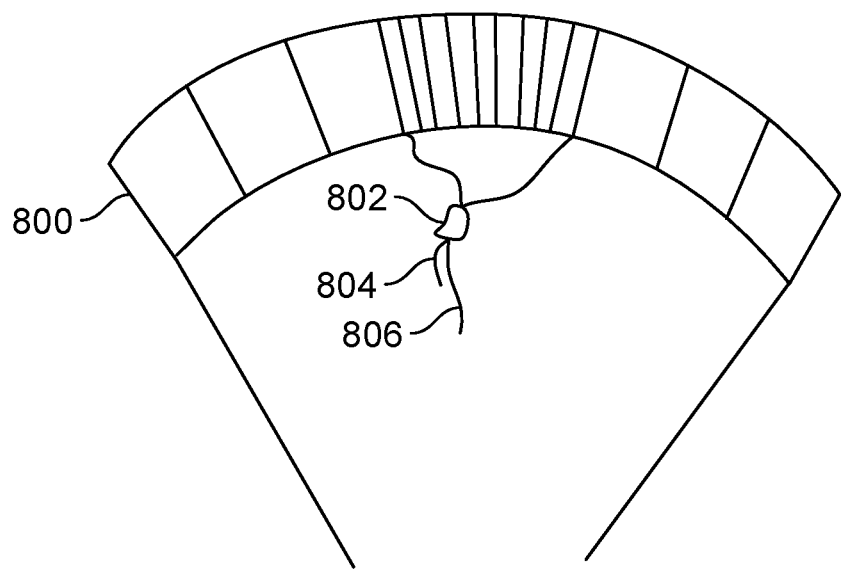
FIG. 8A is a diagram illustrating an embodiment of a cinched rectangular parachute.

FIG. 8A is a diagram illustrating an embodiment of a cinched rectangular parachute. A cinched parachute may include a non-elliptical parachute. Parachute 800 as shown is a curved oblong shape. Control tethers 806 and 804 are used to cinch the parachute in its center. The control tethers may be attached to an underside of the parachute. In some embodiments, one continuous control tether is used. The continuous control tether may be threaded around edges of a section to be cinched. The parachute as shown comprises multiple panels. The panels may be folded together or stacked when the parachute is cinched. The cinched section may be configured to be streamlined and aerodynamic when cinched. In the example shown, control tethers 804 and 806 held in component 802. Component 802 may comprise a holding device and a severing device.

Figure 8B:
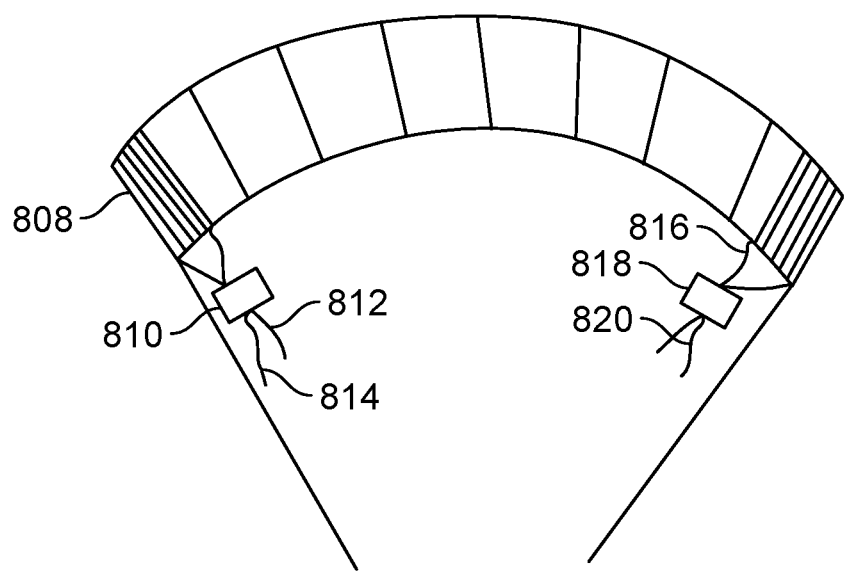
FIG. 8B is a diagram illustrating an embodiment of a cinched rectangular parachute.

FIG. 8B is a diagram illustrating an embodiment of a cinched rectangular parachute. A parachute may comprise multiple cinched sections or multiple control tethers. In the example shown, parachute 808 is cinched at its two shortest ends. A leftmost section is cinched via control tethers 812 and 814. Tethers 812 and 814 are positioned in holding device 810. On an opposite side of the parachute, another section is cinched via control tethers 816 and 820. Control tethers 816 and 820 are secured in holding device 818. Holding devices 810 and 818 may comprise a severing device.

Figure 8C:
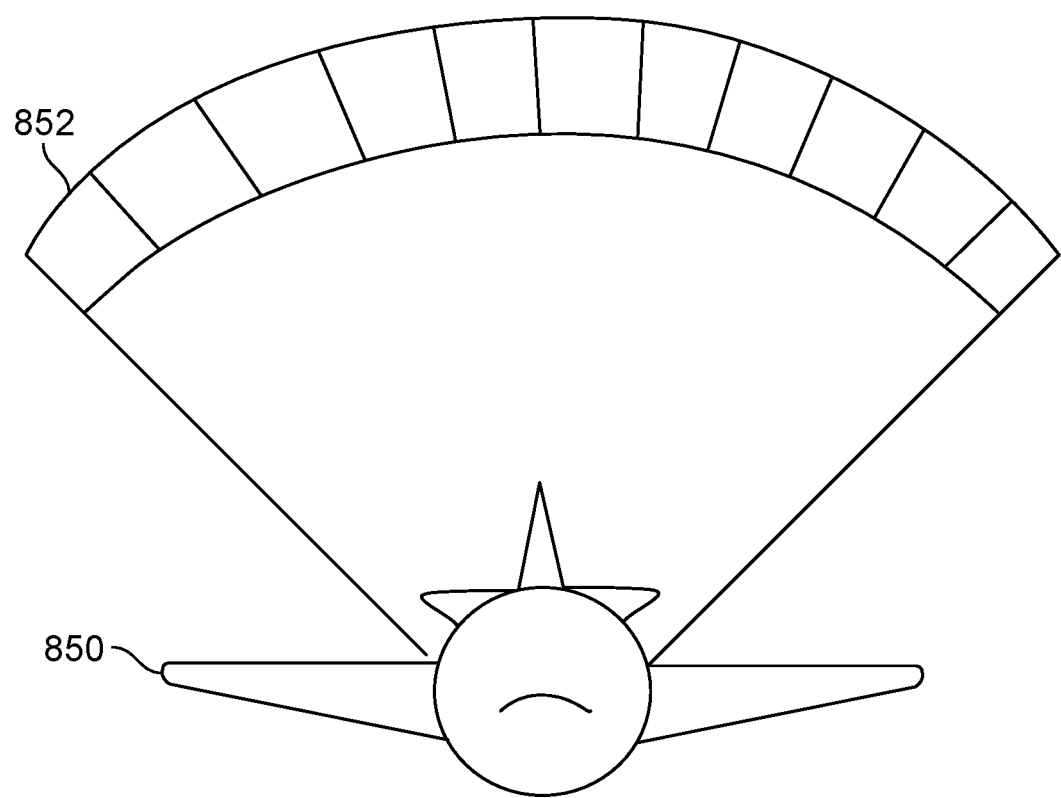
FIG. 8C is a diagram illustrating an embodiment of a cinched rectangular parachute in a released state.

FIG. 8C is a diagram illustrating an embodiment of a cinched rectangular parachute in a released state. In the example shown, aircraft 850 is supported via parachute 852. Parachute 852 is fully expanded lengthwise. Control tethers may have been released or severed.

Figure 9:
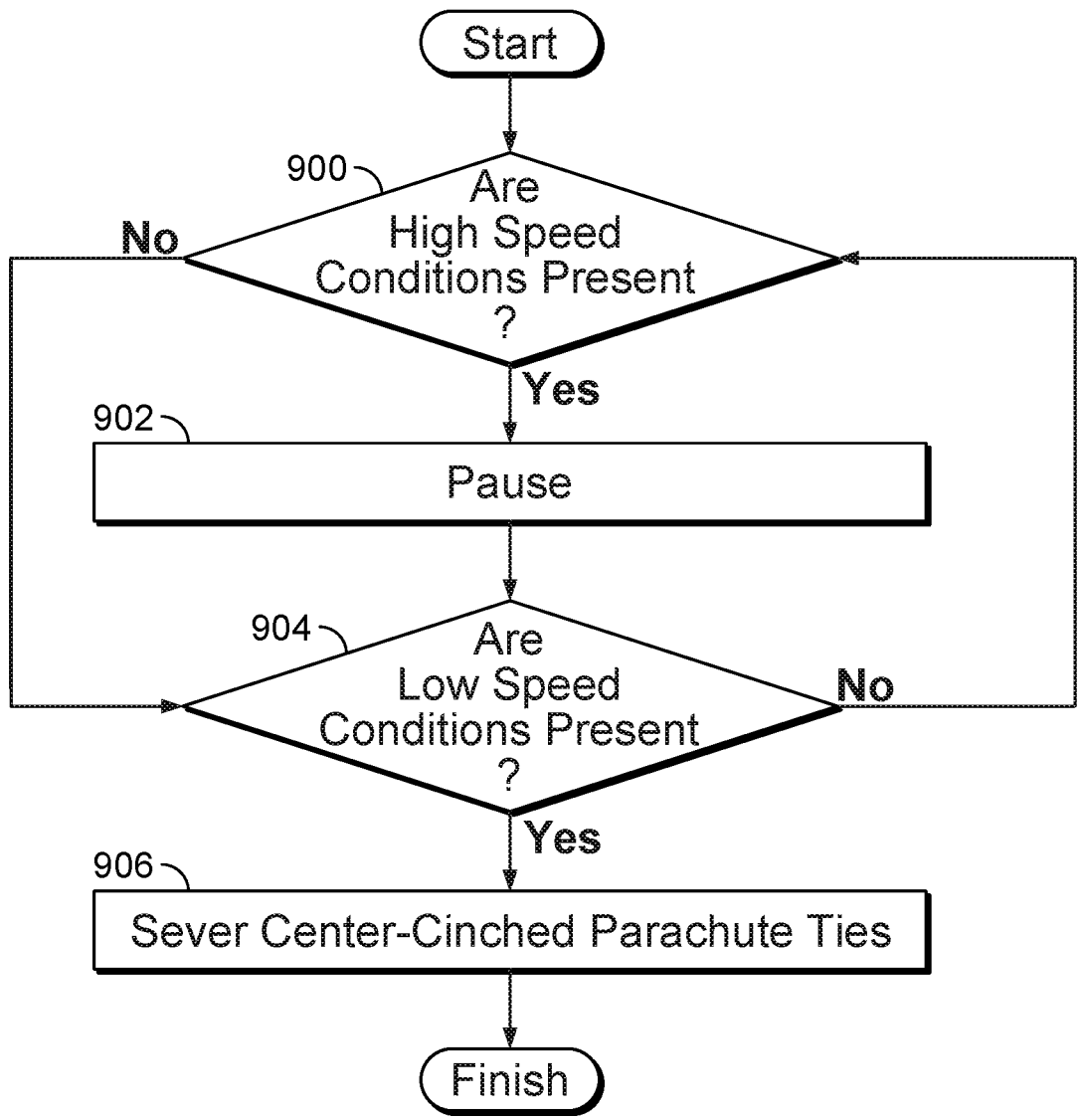
FIG. 9 is a flow diagram illustrating an embodiment of a cinched parachute deployment process.

FIG. 9 is a flow diagram illustrating an embodiment of a cinched parachute deployment process. The process may be fulfilled by an automated system. In the example shown, the parachute may be cinched by default. In 900, it is determined whether high speed conditions are present. In the event high speed conditions are present, in 902 a pause is taken. A pause may be taken because in a cinched state, the parachute is already optimized for high speed conditions. The system may pause for a predetermined amount of time. The length of the pause may depend on weather conditions, speed, or any other appropriate factor. In the event high speed conditions are not present or the pause is taken, in 904 it is determined whether low speed conditions are present. In some embodiments, after the cinched parachute has been deployed for some time, the aircraft is slowed to a point where a loosened parachute is desired. In the event that low speed conditions are not in present, the process returns to 900. In the event that low speed conditions are present, in 906 the cinched parachute ties are severed. Severing the ties may allow the parachute to fully expand, optimizing the parachute for the conditions. The process is finished.

In various embodiments, the process involves multiple factors. For example, an altitude of the target may also be considered. The parachute may be deployed in a loosened position immediately in the event that the target is close to ground and deploying in a cinched position would not slow the target quickly enough. In the event a risk of the parachute ripping is low enough, the parachute may be deployed in a loosened state. The process may be automated based on a combination of airspeed, altitude, and conditions.

The cinched parachute may comprise a processor and a computer memory. Instructions regarding automation of the cinched parachute process may be provided by the processor. The instructions may be stored in the computer memory. The cinched parachute deployment process may be a mechanical process. For example, springs or switches may be used.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A cinched parachute, comprising:
   a canopy comprising one or more sections of canopy material, wherein a first panel of the canopy is configured to be moved in a first direction and a second panel of the canopy is configured to be moved in a second direction different from the first direction; and
   a control device including:
   a tether configured to control an amount of air entering the canopy;
   a holding device configured to constrain or release the tether, wherein the holding device comprises a brake pad or a clamp; and
   a severing device configured to sever the tether, wherein the control device is integrated with the canopy and controls dimensions of the canopy material including widening an opening atop the parachute in response to the first panel and the second panel moving in different directions.

2. The cinched parachute of claim 1, wherein the control device is threaded through the parachute.

3. The cinched parachute of claim 1, wherein the control device controls a size of the opening atop the parachute.

4. The cinched parachute of claim 1, wherein the control device is positioned between tethers of the parachute and the opening atop the parachute.

5. The cinched parachute of claim 1, wherein the control device is positioned to pull a section of the canopy material into a packed state.

6. The cinched parachute of claim 1, wherein the control device traverses a casing in the canopy of the parachute.

7. The cinched parachute of claim 1, wherein at least one end of the tether is secured in the holding device that releases or pulls in the tether.

8. The cinched parachute of claim 1, wherein the holding device allows the tether to travel in one direction and not in a reverse direction through the holding device.

9. The cinched parachute of claim 8, wherein the holding device is positioned on or in an object that is tethered to the parachute.

10. The cinched parachute of claim 8, wherein the holding device is positioned adjacent to the canopy of the parachute.

11. The cinched parachute of claim 1, wherein the tether is positioned such that the severing device is able to sever the tether.

12. The cinched parachute of claim 1, wherein the severing device severs the tether to widen the opening within a threshold time.

13. The cinched parachute of claim 1, wherein the parachute is tethered to an object comprising a timing device.

14. The cinched parachute of claim 13, wherein the timing device is configured to trigger the holding device or the severing device to perform an action on the tether.

15. The cinched parachute of claim 1, wherein the parachute is contracted in the event the parachute experiences speed conditions above a threshold and is widened in the event the parachute experiences speed conditions below the threshold.

16. The cinched parachute of claim 1, wherein the control device is controlled automatically based on sensor information.

17. The cinched parachute of claim 1, wherein the parachute is tethered to an object comprising sensors.

18. The cinched parachute of claim 1, wherein the control device comprises one or more additional tethers.

19. A control device comprising:
   a tether configured to control an amount of air entering a canopy, wherein the canopy includes one or more sections of canopy material, a first panel of the canopy is configured to be moved in a first direction, and a second panel of the canopy is configured to be moved in a second direction different from the first direction;
   a holding device configured to constrain or release the tether, wherein the holding device comprises a brake pad or a clamp; and
   a severing device configured to sever the tether, wherein the control device is integrated with the canopy and controls dimensions of the canopy material including widening an opening atop the canopy in response to the first panel and the second panel moving in different directions.

* * * * *